United States Patent
Badr

(10) Patent No.: US 12,013,911 B2
(45) Date of Patent: Jun. 18, 2024

(54) PAGE-BASED PREDICTION OF USER INTENT

(71) Applicant: GOOGLE LLC, Mountain View, CA (US)

(72) Inventor: Ibrahim Badr, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/078,765

(22) Filed: Dec. 9, 2022

(65) Prior Publication Data

US 2023/0105092 A1  Apr. 6, 2023

Related U.S. Application Data

(63) Continuation of application No. 17/138,612, filed on Dec. 30, 2020, now Pat. No. 11,526,570.

(51) Int. Cl.
| | | |
|---|---|---|
| *G06F 16/954* | (2019.01) | |
| *G06F 16/9535* | (2019.01) | |
| *G06F 16/957* | (2019.01) | |
| *H04L 67/50* | (2022.01) | |

(52) U.S. Cl.
CPC ........ *G06F 16/954* (2019.01); *G06F 16/9535* (2019.01); *G06F 16/9574* (2019.01); *H04L 67/535* (2022.05)

(58) Field of Classification Search
CPC ............... G06F 16/954; G06F 16/9535; G06F 16/9574; H04L 67/535
See application file for complete search history.

(56) References Cited

U.S. PATENT DOCUMENTS

| | | | |
|---|---|---|---|
| 8,645,300 B1 | 2/2014 | Cowdrey et al. | |
| 8,775,275 B1 | 7/2014 | Pope | |
| 9,342,490 B1 | 5/2016 | Taylor et al. | |
| 10,373,171 B2* | 8/2019 | Ryabchun | G06Q 30/0201 |
| 2014/0279793 A1* | 9/2014 | Wohlstadter | G06Q 30/0277 |
| | | | 706/46 |
| 2015/0066889 A1* | 3/2015 | Bennett | G06F 16/9535 |
| | | | 707/706 |
| 2015/0269261 A1* | 9/2015 | Bennett | G06F 3/0482 |
| | | | 707/706 |
| 2019/0042976 A1 | 2/2019 | Tanglertsampan et al. | |
| 2019/0087691 A1 | 3/2019 | Jelveh | |
| 2019/0266203 A1* | 8/2019 | White | G06F 16/9535 |
| 2020/0042649 A1 | 2/2020 | Bakis et al. | |
| 2020/0174630 A1* | 6/2020 | Rosenberg | G09B 5/00 |
| 2021/0383252 A1 | 12/2021 | Arnold et al. | |
| 2022/0207093 A1 | 6/2022 | Badr | |

* cited by examiner

*Primary Examiner* — Dangelino N Gortayo
(74) *Attorney, Agent, or Firm* — Gray Ice Higdon

(57) ABSTRACT

Techniques are described herein for determining a predicted intent of a user and displaying additional content selected based on the predicted intent of the user. A method includes: receiving information identifying a webpage that a user is visiting and a navigational path of the user in navigating to the webpage; determining a predicted intent of the user based on the information identifying the webpage that the user is visiting and the navigational path of the user in navigating to the webpage; selecting additional content based upon the predicted intent of the user; and displaying an overlay, on a portion of the webpage, that includes the additional content.

20 Claims, 7 Drawing Sheets

PAGE-BASED PREDICTION OF USER INTENT

BACKGROUND

Users may visit multiple webpages in the process of completing a particular task. For example, a user may initiate a shopping task by visiting an Internet search engine and performing a search for general information about a particular product or product category (e.g., "blue jeans"). After reviewing the search results returned in response to the user's search, the user may follow various links in the search results and visit multiple webpages to learn more about the particular product or product category (e.g., available blue jeans). As the user progresses through the shopping task, the user may visit a number of additional webpages as the user focuses the search on specific brands, models, and/or styles, identifies a particular item for purchase, and finally selects a store from which to purchase the particular item.

This manual approach, however, may be an inefficient use of user time and computer resources, as it may result in excessive client device usage. Additionally, the client device may experience latency issues while loading multiple webpages in response to user requests. Moreover, users may have difficulty manually identifying webpages that include information necessary or useful for completion of the task, and doing so may often take an extended amount of time (e.g., to identify helpful websites and content, etc.) and, as a result, can lead to excess usage of power resources and/or other computational resource(s) of a client device used in manually identifying the webpages. This can be exacerbated when the client device has a relatively small display and/or a software keyboard, both of which can prolong the amount of time needed to manually identify webpages that include information useful for the completion of the task.

SUMMARY

Implementations disclosed herein relate to determining a predicted intent of a user and displaying additional content selected based on the predicted intent of the user. Implementations may predict a user's intent (e.g., performing initial research into available products, ready to buy, etc.) when visiting a webpage (e.g., a shopping webpage or product webpage), and provide relevant content recommendations (e.g., articles, reviews, related questions, options to buy, related videos, etc.) based on the predicted user intent (e.g., in a slide drawer overlaid on the webpage). For example, if a user is performing initial research into available products, implementations may show articles providing an overview of products in a particular category of interest, related products, etc. If the user is performing research but is focused on specific products, implementations may show product reviews and comparisons, etc. If the user is about to buy, implementations may provide price comparisons, etc.

In some implementations, the system may predict user intent based on how the user arrives at the webpage. For example, if a user arrives at a webpage related to Smartphone Model X by following a link included in search results from a search of "Smartphone Model X", implementations may predict a "ready to buy intent", whereas if a user arrives at a webpage related to Smartphone Model X by following a link included in search results from a search of "good smartphones", implementations may predict an "initial research" intent.

In various implementations, a method implemented by one or more processors may include receiving information identifying a webpage that a user is visiting and a navigational path of the user in navigating to the webpage; determining a predicted intent of the user based on the information identifying the webpage that the user is visiting and the navigational path of the user in navigating to the webpage; selecting additional content based upon the predicted intent of the user; and displaying an overlay, on a portion of the webpage, that includes the additional content.

In some implementations, the additional content is further selected based on properties of the webpage, the properties of the webpage including a category of content included in the webpage or a function provided by the webpage. In some implementations, the method may further include determining, based on the predicted intent of the user, whether or not to precache the additional content.

In some implementations, the method may further include, in response to determining that the additional content is to be precached, precaching the additional content prior to the displaying the overlay that includes the additional content; and monitoring to determine an occurrence of one or more display conditions. In some implementations, the displaying the overlay may be responsive to determining the occurrence of one or more of the display conditions. In some implementations, the one or more display conditions include a length of time, of the user visiting the webpage, exceeding a time threshold. In some implementations, the one or more display conditions include a scroll percentage of the webpage exceeding a scroll threshold.

In some implementations, a web browser plugin causes the overlay to be displayed on the portion of the webpage. In some implementations, the receiving information identifying the webpage and the navigational path, the determining the predicted intent of the user, the selecting the additional content, and the displaying the overlay are in response to determining that user interface input, provided by the user, is a request for the additional content from the user.

In some additional or alternative implementations, a computer program product may include one or more computer-readable storage media having program instructions collectively stored on the one or more computer-readable storage media. The program instructions may be executable to: receive user interface input provided by a user who is visiting a webpage, that is determined to be a request for additional content; and in response to receiving the user interface input that is determined to be the request for the additional content: receive information identifying the webpage that the user is visiting and device activity history of the user; determine a predicted intent of the user based on the information identifying the webpage that the user is visiting and the device activity history of the user; select additional content based upon the predicted intent of the user; and display an overlay that includes the additional content on a portion of the webpage.

In some implementations, the device activity history of the user includes webpage navigation history of the user, searches of the user, applications accessed by the user, application states of the applications accessed by the user, or messages sent or received by the user.

In some implementations, the user interface input comprises a selection of a button provided by a web browser plugin. In some implementations, the program instructions are further executable to cause the button to be displayed in response to a length of time, of the user visiting the webpage, exceeding a time threshold. In some implementations, the program instructions are further executable to cause the button to be displayed in response to a scroll percentage of the webpage exceeding a scroll threshold.

In some additional or alternative implementations, a system may include a processor, a computer-readable memory, one or more computer-readable storage media, and program instructions collectively stored on the one or more computer-readable storage media. The program instructions may be executable to: receive information identifying a webpage that a user is visiting and a navigational path of the user in navigating to the webpage; determine a predicted intent of the user based on the information identifying the webpage that the user is visiting and the navigational path of the user in navigating to the webpage; select additional content based upon the predicted intent of the user; and display an overlay, on a portion of the webpage, that includes the additional content.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
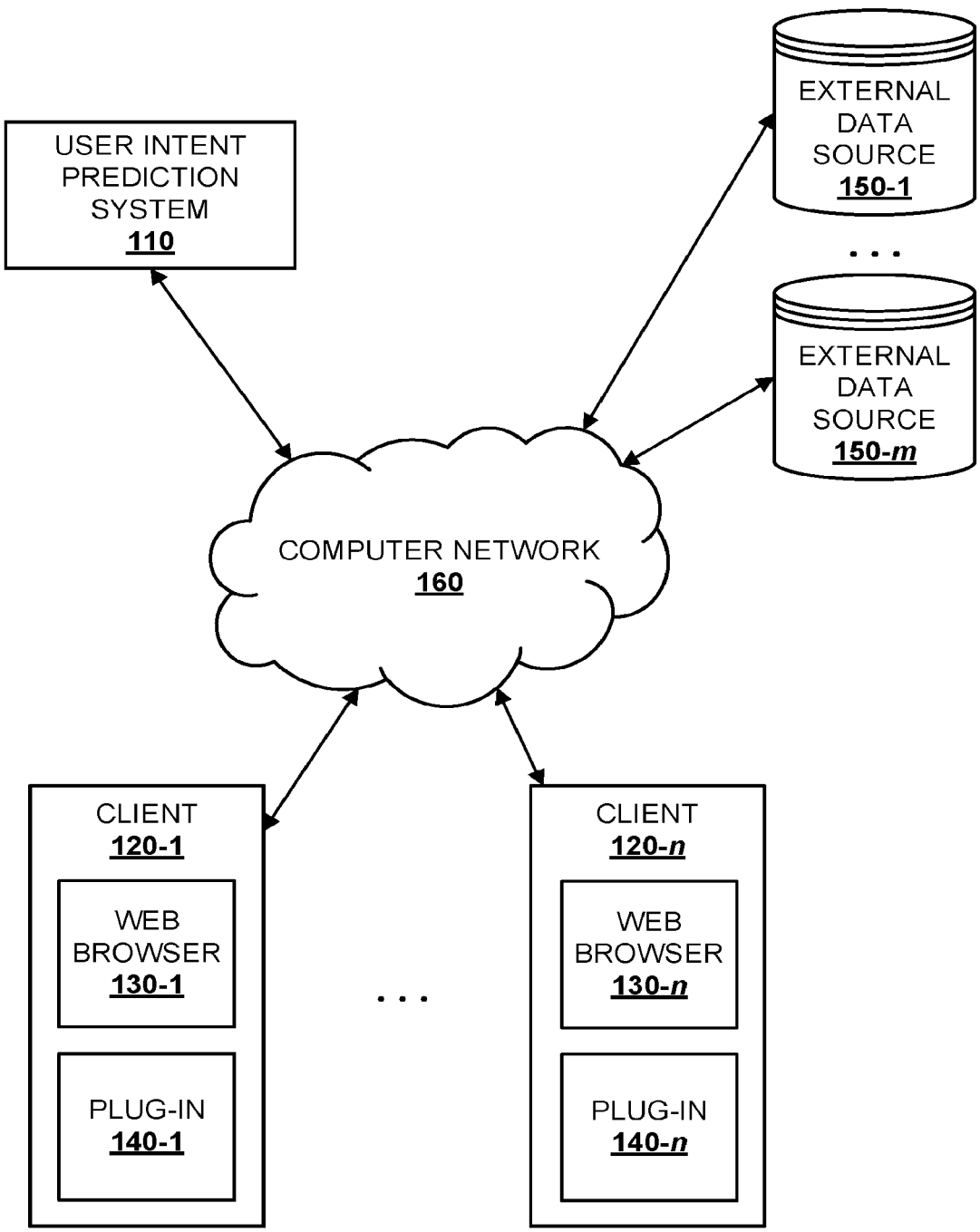
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a user intent prediction system 110, may be implemented using one or more server computing devices that form what is sometimes referred to as a "cloud infrastructure," although this is not required.

In implementations, the environment 100 may include a user intent prediction system 110 that implements a system that determines a predicted intent of a user and displays additional content selected based on the predicted intent of the user, that is accessible from various clients, including clients 120-1, . . . , 120-n that may be included in the environment 100, through either a thin client interface, such as a web browser, or a program interface. The user intent prediction system 110 and the clients 120-1, . . . , 120-n may be in communication via a computer network 160, which may be any suitable network including any combination of a local area network (LAN), wide area network (WAN), or the Internet.

Each of the clients 120-1, . . . , 120-n may be, for example, a user computing device that is used by a user to access webpages via a web browser 130-1, . . . , 130-n. Each of the clients 120-1, . . . , 120-n may also include a plug-in 140-1, . . . , 140-n that provides additional functionality on top of the web browser 130-1, . . . , 130-n. In an example, the clients 120-1, . . . , 120-n may be user computing devices associated with an individual or an entity or organization such as a business (e.g., financial institute, bank, etc.), non-profit, club, university, government agency, or any other organization. For example, a user may operate the web browser 130-1, . . . , 130-n to browse product, research products, purchase products, and so forth.

In various implementations, the environment 100 may include external data sources 150-1, . . . , 150-m that store additional content that may be accessible to the user intent prediction system 110 and/or the clients 120-1, . . . , 120-n via the computer network 160 or another network.

The user intent prediction system 110 may be configured to receive information identifying a webpage that a user is visiting and a navigational path of the user in navigating to the webpage, from a web browser 130-1, . . . , 130-n and/or a plug-in 140-1, . . . , 140-n, determine a predicted intent of the user, select additional content (e.g., from one or more of the external data sources 150-1, . . . , 150-m) based upon the predicted intent of the user, and cause the additional content to be displayed by the web browser 130-1, . . . , 130-n.

Figure 2:
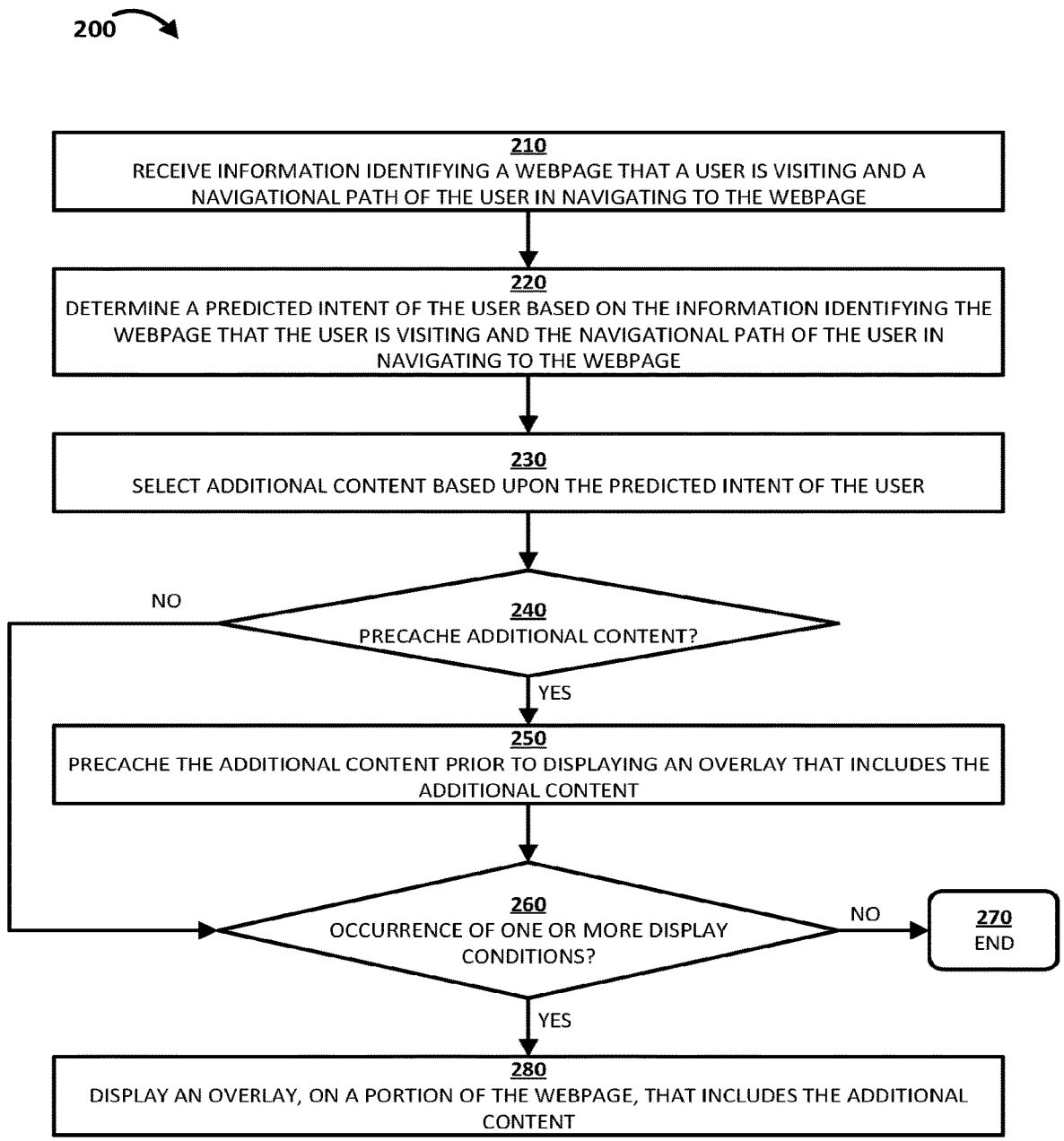
FIG. 2 depicts a flowchart illustrating an example method of determining a predicted intent of a user and displaying additional content selected based on the predicted intent of the user, in accordance with various implementations.

FIG. 2 depicts a flowchart illustrating an example method 200 of determining a predicted intent of a user and displaying additional content selected based on the predicted intent of the user. For convenience, the operations of the method 200 are described with reference to a system that performs the operations. This system of method 200 includes one or more processors and/or other component(s) of various computer systems. Moreover, while operations of method 200 are shown in a particular order, this is not meant to be limiting. One or more operations may be reordered, omitted, or added.

At block 210, the system receives information identifying a webpage that a user is visiting and a navigational path of the user in navigating to the webpage. In some implementations, in response to a user of one of the clients 120-1, . . . , 120-n using one of the web browsers 130-1, . . . , 130-n to visit a webpage, the user intent prediction system 110 may receive (e.g., from the web browser 130-1, . . . , 130-n or the plug-in 140-1, . . . , 140-n) information identifying the webpage that the user is visiting and a navigational path of the user in navigating to the webpage.

Still referring to block 210, in some implementations, the information identifying the webpage may include one or more of a web address such as a uniform resource locator (URL), a webpage name or title, a name of and/or information about an entity associated with the webpage, or any other identifier or information usable to identify the webpage and/or to identify the content of the webpage. In some implementations, the navigational path of the user in navigating to the webpage may include information about a navigational path taken by the user to arrive at the webpage. The navigational path of the user in navigating to the webpage may include previous pages visited by the user prior to arriving at the webpage, links selected by the user prior to arriving at the webpage, and/or search queries performed by the user prior to arriving at the webpage.

Still referring to block 210, in one example, the navigational path of the user in navigating to the webpage may include a user typing, in an address bar of one of the web browsers 130-1, . . . , 130-n, a web address (URL) for an Internet search engine and inputting a particular term or phrase as a search query (or inputting the particular term or phrase as the search query directly into an address bar of one of the web browsers 130-1, . . . , 130-n) and then selecting a link in the search results to cause the web browser 130-1, . . . , 130-n to display the webpage. In another example, the navigational path of the user in navigating to the webpage may include a user typing in a web address (URL) for a website (e.g., a merchant website or a brand website), browsing various other webpages of the website (e.g., starting at a homepage and following various links), and then selecting a link that causes the web browser 130-1, . . . , 130-n to display the webpage.

At block 220, the system determines a predicted intent of the user based on the information identifying the webpage that the user is visiting and the navigational path of the user in navigating to the webpage. In some implementations, the user intent prediction system 110 may use the information identifying the webpage that the user is visiting and the navigational path of the user in navigating to the webpage, received at block 210, to determine the predicted intent of the user. In some implementations, the user intent prediction system 110 may optionally determine a confidence level associated with the predicted intent, the confidence level indicating a strength of the prediction. For example, in the case where the information identifying the webpage that the user is visiting and the navigational path of the user in navigating to the webpage are strongly associated with the predicted intent, the user intent prediction system 110 may determine a relatively higher confidence level, while in the case where the information identifying the webpage that the user is visiting and the navigational path of the user in navigating to the webpage are weakly associated with the predicted intent, the user intent prediction system 110 may determine a relatively lower confidence level.

Still referring to block 220, in some implementations, the user intent prediction system 110 may use a set of rules to select the predicted intent from a set of intents and optionally determine the confidence level associated with the predicted intent. In an example, the user intent prediction system 110 may use the information identifying the webpage to determine that the webpage that relates to one or more products, and the user intent prediction system 110 may then use a set of rules to select, based on the navigational path of the user in navigating to the webpage, a predicted intent from a set of intents that includes "information gathering" (e.g., exploring various products), "tracking" (e.g., following a product for updates), "purchasing" (e.g., ready to buy a product), etc.

Still referring to block 220, in other implementations, the user intent prediction system 110 may use machine learning techniques to select the predicted intent from a set of intents and optionally determine the confidence level associated with the predicted intent. In an example, the user intent prediction system 110 may use the information identifying the webpage to determine that the webpage that relates to one or more products, and the user intent prediction system 110 may then use the navigational path of the user in navigating to the webpage as input to a machine learning model. The user intent prediction system 110 may select, based on output of the machine learning model, a predicted intent from a set of intents that includes "information gathering" (e.g., exploring various products), "tracking" (e.g., following a product for updates), "purchasing" (e.g., ready to buy a product), etc.

At block 230, the system selects additional content based upon the predicted intent of the user. In some implementations, the user intent prediction system 110 may select the additional content based upon the predicted intent determined at block 220. In some implementations, the additional content is further selected based on properties of the webpage. The properties of the webpage may include a category of content (e.g., products for purchase) included in the webpage or a function (e.g., shopping) provided by the webpage.

Still referring to block 230, in some implementations, the user intent prediction system 110 may associate a set of rules for selecting additional content with each of the intents in the set of intents. For example, an "information gathering" intent may be associated with a first set of rules for selecting additional content, a "tracking" intent may be associated with a second set of rules for selecting additional content, and a "purchasing" intent may be associated with a third set of rules for selecting additional content. In some implementations, the user intent prediction system 110 may select the additional content from content available in one or more of the external data sources 150-1, . . . , 150-n.

Still referring to block 230, in an example, if the user intent prediction system 110 determines at block 220 that the predicted intent of the user is an "information gathering" intent, and the properties of the webpage indicate that the category of content is "products for purchase", then the user intent prediction system 110 may select, as the additional content, an article that provides an overview of a product category corresponding to the webpage that the user is visiting, a comparison of products available in the product category, and/or reviews of one or more products available in the product category, etc. In another example, if the user intent prediction system 110 determines at block 220 that the predicted intent of the user is a "purchasing" intent, and the properties of the webpage indicate that the category of content is "products for purchase", then the user intent prediction system 110 may select, as the additional content, information about online and/or local stores where the user may purchase a product corresponding to the webpage that the user is visiting, product availability information, and/or a comparison of offers available from various stores, etc.

At block 240, based on the predicted intent of the user, the system determines whether or not to precache the additional content. In some implementations, the user intent prediction system 110 may determine whether or not to precache the additional content that is selected at block 230 based on the predicted intent of the user that is determined at block 220. If, at an iteration of block 240, the system determines that the confidence level associated with the predicted intent, determined at block 220, does not exceed a threshold, then the system proceeds to block 260. On the other hand, if, at an iteration of block 240, the system determines that the confidence level associated with the predicted intent, determined at block 220, exceeds the threshold, then the system proceeds to block 250.

Still referring to block 240, in other implementations, the user intent prediction system 110 may default to precaching the additional content (i.e., at block 240, the system may determine that the additional content is to be precached) and proceed to block 250. In still other implementations, the user intent prediction system 110 may default to not precaching the additional content (i.e., at block 240, the system may determine that the additional content is not to be precached) and proceed to block 260.

At block 250, in response to determining that the additional content is to be precached at block 240, the system precaches the additional content prior to displaying an overlay that includes the additional content. In some implementations, the user intent prediction system 110 may cause the web browser 130-1, . . . , 130-n or the plug-in 140-1, . . . , 140-n to retrieve the additional content from one or more of the external data sources 150-1, . . . , 150-m and precache the additional content. In other implementations, the user intent prediction system 110 may retrieve the additional content from one or more of the external data sources 150-1, . . . , 150-m and send it to the web browser 130-1, . . . , 130-n or the plug-in 140-1, . . . , 140-n to be precached.

At block 260, the system monitors to determine an occurrence of one or more display conditions. In some implementations, the user intent prediction system 110, the web browser 130-1, . . . , 130-n, or the plug-in 140-1, . . . , 140-n may monitor to determine whether or not there is an occurrence of one or more display conditions. If, at an iteration of block 260, the system determines that there is not an occurrence of one or more display conditions, then the system proceeds to block 270, and the flow ends. On the other hand, if, at an iteration of block 260, the system determines that there is an occurrence of one or more display conditions, then the system proceeds to block 280.

Still referring to block 260, in some implementations, the one or more display conditions include a length of time, of the user visiting the webpage, exceeding a time threshold. In other implementations, the one or more display conditions include a scroll percentage of the webpage exceeding a scroll threshold (e.g., a user has scrolled from the top of a webpage through at least 85% of the webpage). In still other implementations, the one or more display conditions include receiving user interface input (e.g., a selection of a button provided by the web browser 130-1, . . . , 130-n, or the plug-in 140-1, . . . , 140-n), provided by a user, that is a request for the additional content from the user. In still other implementations, the one or more display conditions include a confidence level associated with the predicted intent, determined at block 220, exceeding a threshold confidence level. The system may additionally or instead monitor for the occurrence of other display conditions.

At block 280, responsive to determining the occurrence of one or more of the display conditions at block 260, the system displays an overlay, on a portion of the webpage, that includes the additional content that is selected at block 230 (and that is potentially precached at block 250, depending on the determination at block 240). In some implementations, the plug-in 140-1, . . . , 140-n to the web browser 130-1, . . . , 130-n (or the web browser 130-1, . . . , 130-n) causes the overlay, that includes the additional content, to be displayed on the portion of the webpage (e.g., a lower 25% of the webpage). The plug-in 140-1, . . . , 140-n (or the web browser 130-1, . . . , 130-n) may cause the overlay, that includes the additional content, to "slide" or "peek" over the portion of the webpage. In other implementations, the system may cause the additional content to be displayed separately from the webpage, e.g., in a bottom portion of the web browser 130-1, . . . , 130-n, or the plug-in 140-1, . . . , 140-n), a location adjacent to the webpage, and/or in a separate tab or window of the web browser 130-1, . . . , 130-n, etc.

In other implementations, at block 280, in addition to displaying the additional content in the overlay, the system may also display, in the overlay, one or more "related questions" that are determined based on search queries that return results that are most often used to navigate to the webpage. These "related questions" may be displayed as selectable links that, when selected, cause search results for the selected "related question" to be displayed.

In other implementations, the receiving information identifying the webpage and the navigational path (at block 210), the determining the predicted intent of the user (at block 220), the selecting the additional content (at block 230), and the displaying the overlay (at block 280) are in response to determining that user interface input, provided by the user, is a request for the additional content from the user.

Figure 3:
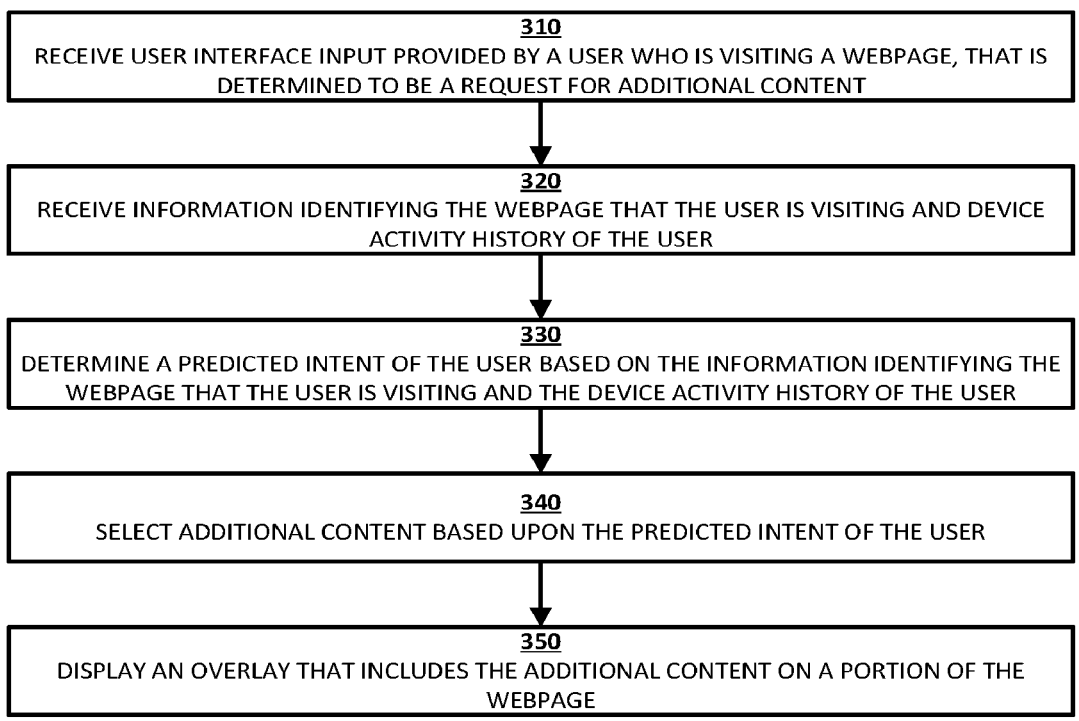
FIG. 3 depicts a flowchart illustrating an example method of determining a predicted intent of a user and displaying additional content selected based on the predicted intent of the user, in accordance with various implementations.

FIG. 3 depicts a flowchart illustrating an example method 300 of determining a predicted intent of a user and displaying additional content selected based on the predicted intent of the user. For convenience, the operations of the method 300 are described with reference to a system that performs the operations. This system of method 300 includes one or more processors and/or other component(s) of various computer systems. Moreover, while operations of method 300 are shown in a particular order, this is not meant to be limiting. One or more operations may be reordered, omitted, or added.

At block 310, the system receives user interface input provided by a user who is visiting a webpage, that is determined to be a request for additional content. In some implementations, the user intent prediction system 110 receives, from the web browser 130-1, . . . , 130-n, or the plug-in 140-1, . . . , 140-n, user interface input that is a request for the additional content from the user. In some implementations, the web browser 130-1, . . . , 130-n or the plug-in 140-1, . . . , 140-n causes a button to be displayed in response to a length of time, of the user visiting the webpage, exceeding a time threshold, and the user interface input is a selection of the button, by a user. In other implementations, the web browser 130-1, . . . , 130-n or the plug-in 140-1, . . . , 140-n causes a button to be displayed in response to a scroll percentage of the webpage exceeding a scroll threshold, and the user interface input is a selection of the button, by a user.

At block 320, in response to receiving the user interface input that is determined to be the request for the additional content, the system receives information identifying the webpage that the user is visiting and device activity history of the user. In some implementations, the user intent prediction system 110 may receive (e.g., from the web browser 130-1, . . . , 130-n or the plug-in 140-1, . . . , 140-n) information identifying the webpage that the user is visiting and device activity history of the user (e.g., associated with one of the clients 120-1, . . . , 120-n).

Still referring to block 320, in some implementations, the information identifying the webpage may include one or more of a web address such as a uniform resource locator (URL), a webpage name or title, a name of and/or information about an entity associated with the webpage, or any other identifier or information usable to identify the webpage and/or to identify the content of the webpage. In some implementations, the device activity history of the user may include a navigational path of the user in navigating to the webpage (e.g., information about a navigational path taken by the user to arrive at the webpage). The navigational path of the user in navigating to the webpage may include previous pages visited by the user prior to arriving at the webpage, links selected by the user prior to arriving at the webpage, and/or search queries performed by the user prior to arriving at the webpage.

Still referring to block 320, in one example, the navigational path of the user in navigating to the webpage may include a user typing, in an address bar of one of the web browsers 130-1, . . . , 130-n, a web address (URL) for an Internet search engine and inputting a particular term or phrase as a search query (or inputting the particular term or phrase as the search query directly into an address bar of one of the web browsers 130-1, . . . , 130-n) and then selecting a link in the search results to cause the web browser 130-1, . . . , 130-n to display the webpage. In another example, the navigational path of the user in navigating to the webpage may include a user typing in a web address (URL) for a website (e.g., a merchant website or a brand website), browsing various other webpages of the website (e.g., starting at a homepage and following various links), and then selecting a link that causes the web browser 130-1, . . . , 130-n to display the webpage.

Still referring to block 320, in some implementations, the device activity history of the user may include device activity of the user on one of the clients 120-1, . . . , 120-n, including one or more of searches of the user, applications accessed by the user, application states of the applications accessed by the user, and/or messages sent or received by the user, etc.

At block 330, the system determines a predicted intent of the user based on the information identifying the webpage that the user is visiting and the device activity history of the user. In some implementations, the user intent prediction system 110 may use the information identifying the webpage that the user is visiting and the device activity history of the user, received at block 320, to determine the predicted intent of the user. In some implementations, the user intent prediction system 110 may optionally determine a confidence level associated with the predicted intent, the confidence level indicating a strength of the prediction. For example in the case where the information identifying the webpage that the user is visiting and the device activity history of the user are strongly associated with the predicted intent, the user intent prediction system 110 may determine a relatively higher confidence level, while in the case where the information identifying the webpage that the user is visiting and the device activity history of the user are weakly associated with the predicted intent, the user intent prediction system 110 may determine a relatively lower confidence level.

Still referring to block 330, in some implementations, the user intent prediction system 110 may use a set of rules to select the predicted intent from a set of intents and optionally determine the confidence level associated with the predicted intent. In an example, the user intent prediction system 110 may use the information identifying the webpage to determine that the webpage that relates to one or more products, and the user intent prediction system 110 may then use a set of rules to select, based on the device activity history of the user, a predicted intent from a set of intents that includes "information gathering" (e.g., exploring various products), "tracking" (e.g., following a product for updates), "purchasing" (e.g., ready to buy a product), etc.

Still referring to block 330, in other implementations, the user intent prediction system 110 may use machine learning techniques to select the predicted intent from a set of intents and optionally determine the confidence level associated with the predicted intent. In an example, the user intent prediction system 110 may use the information identifying the webpage to determine that the webpage that relates to one or more products, and the user intent prediction system 110 may then use the device activity history of the user in navigating to the webpage as input to a machine learning model. The user intent prediction system 110 may select, based on output of the machine learning model, a predicted intent from a set of intents that includes "information gathering" (e.g., exploring various products), "tracking" (e.g., following a product for updates), "purchasing" (e.g., ready to buy a product), etc.

At block 340, the system selects additional content based upon the predicted intent of the user. In some implementations, the user intent prediction system 110 may select the additional content based upon the predicted intent determined at block 330. In some implementations, the additional content is further selected based on properties of the webpage. The properties of the webpage may include a category of content (e.g., products for purchase) included in the webpage or a function (e.g., shopping) provided by the webpage.

Still referring to block 340, in some implementations, the user intent prediction system 110 may associate a set of rules for selecting additional content with each of the intents in the set of intents. For example, an "information gathering" intent may be associated with a first set of rules for selecting additional content, a "tracking" intent may be associated with a second set of rules for selecting additional content, and a "purchasing" intent may be associated with a third set of rules for selecting additional content. In some implementations, the user intent prediction system 110 may select the additional content from content available in one or more of the external data sources 150-1, . . . , 150-n.

Still referring to block 340, in an example, if the user intent prediction system 110 determines at block 330 that the predicted intent of the user is an "information gathering" intent, and the properties of the webpage indicate that the category of content is "products for purchase", then the user intent prediction system 110 may select, as the additional content, an article that provides an overview of a product category corresponding to the webpage that the user is visiting, a comparison of products available in the product category, and/or reviews of one or more products available in the product category, etc. In another example, if the user intent prediction system 110 determines at block 330 that the predicted intent of the user is a "purchasing" intent, and the properties of the webpage indicate that the category of content is "products for purchase", then the user intent prediction system 110 may select, as the additional content, information about online and/or local stores where the user may purchase a product corresponding to the webpage that the user is visiting, product availability information, and/or a comparison of offers available from various stores, etc.

At block 350, the system displays an overlay that includes the additional content, that is selected at block 340, on a portion of the webpage. In some implementations, the plug-in 140-1, . . . , 140-n to the web browser 130-1, . . . , 130-n (or the web browser 130-1, . . . , 130-n) causes the overlay, that includes the additional content, to be displayed on the portion of the webpage (e.g., a lower 25% of the webpage). The plug-in 140-1, . . . , 140-*n* (or the web browser 130-1, . . . , 130-*n*) may cause the overlay, that includes the additional content, to "slide" or "peek" over the portion of the webpage. In other implementations, the system may cause the additional content to be displayed separately from the webpage, e.g., in a bottom portion of the web browser 130-1, . . . , 130-*n*, or the plug-in 140-1, . . . , 140-*n*), a location adjacent to the webpage, and/or in a separate tab or window of the web browser 130-1, . . . , 130-*n*, etc.

In other implementations, at block 310, the user intent prediction system 100, the web browser 130-1, . . . , 130-*n*, or the plug-in 140-1, . . . , 140-*n* causes a button or link to be displayed that enables a user to request to "track" the product that is the subject of the webpage that is displayed in the web browser 130-1, . . . , 130-*n* (e.g., in a case where the webpage relates to a single product). In response to receiving user interface input that is a selection of the button or link, by the user, the user intent prediction system 110 may provide future notifications to the user about price changes and/or additional content related to the tracked product. The user intent prediction system 110 may also provide a common dashboard that is displayed in the web browser 130-1, . . . , 130-*n*. The common dashboard may show one or more products that a user has requested to track. The common dashboard may provide functionality for selecting a tracked product and, responsive to the selecting of the tracked product, displaying an overview of what has changed since the user last explored the tracked product.

Figure 4A:
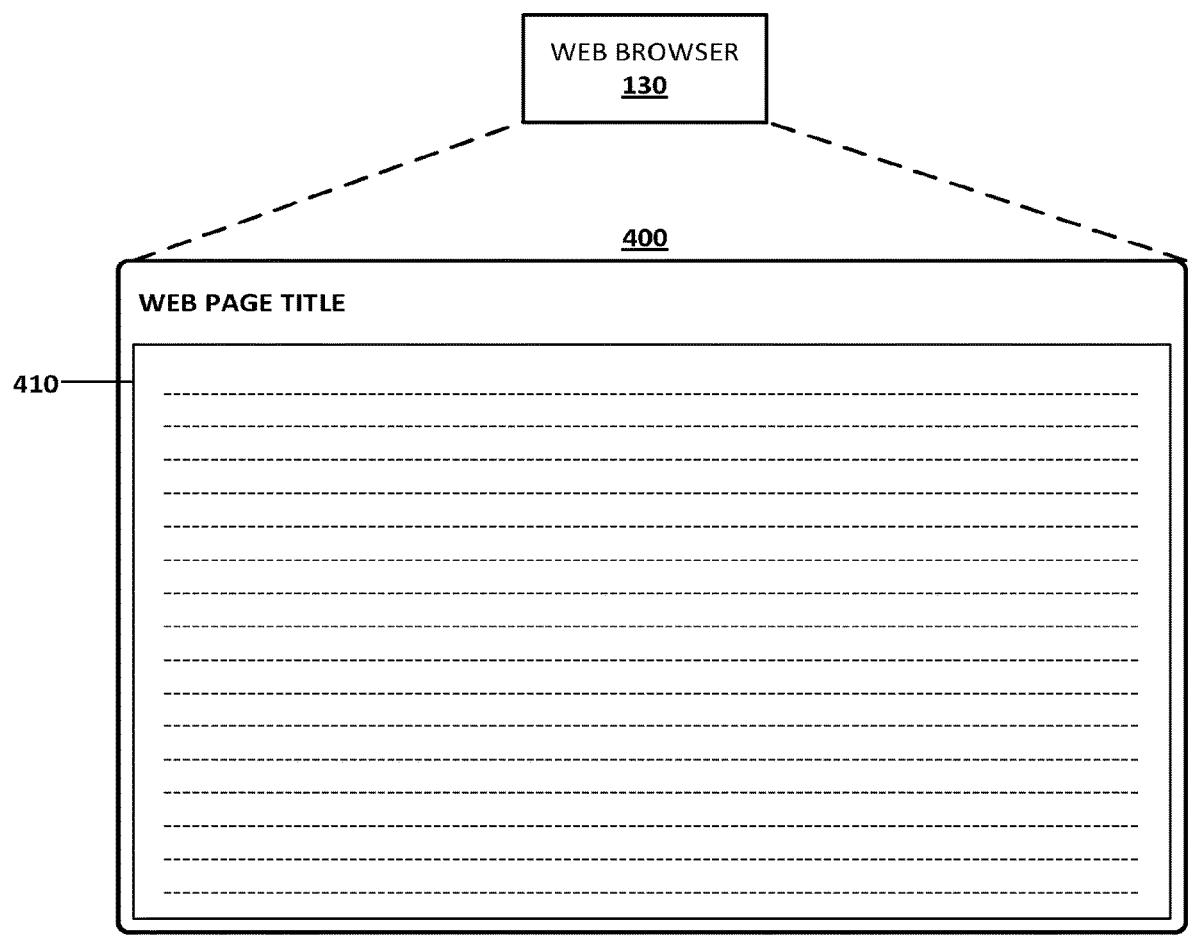
FIG. 4A, FIG. 4B, and FIG. 4C depict an example application of techniques described herein, in accordance with various implementations.
Figure 4B:
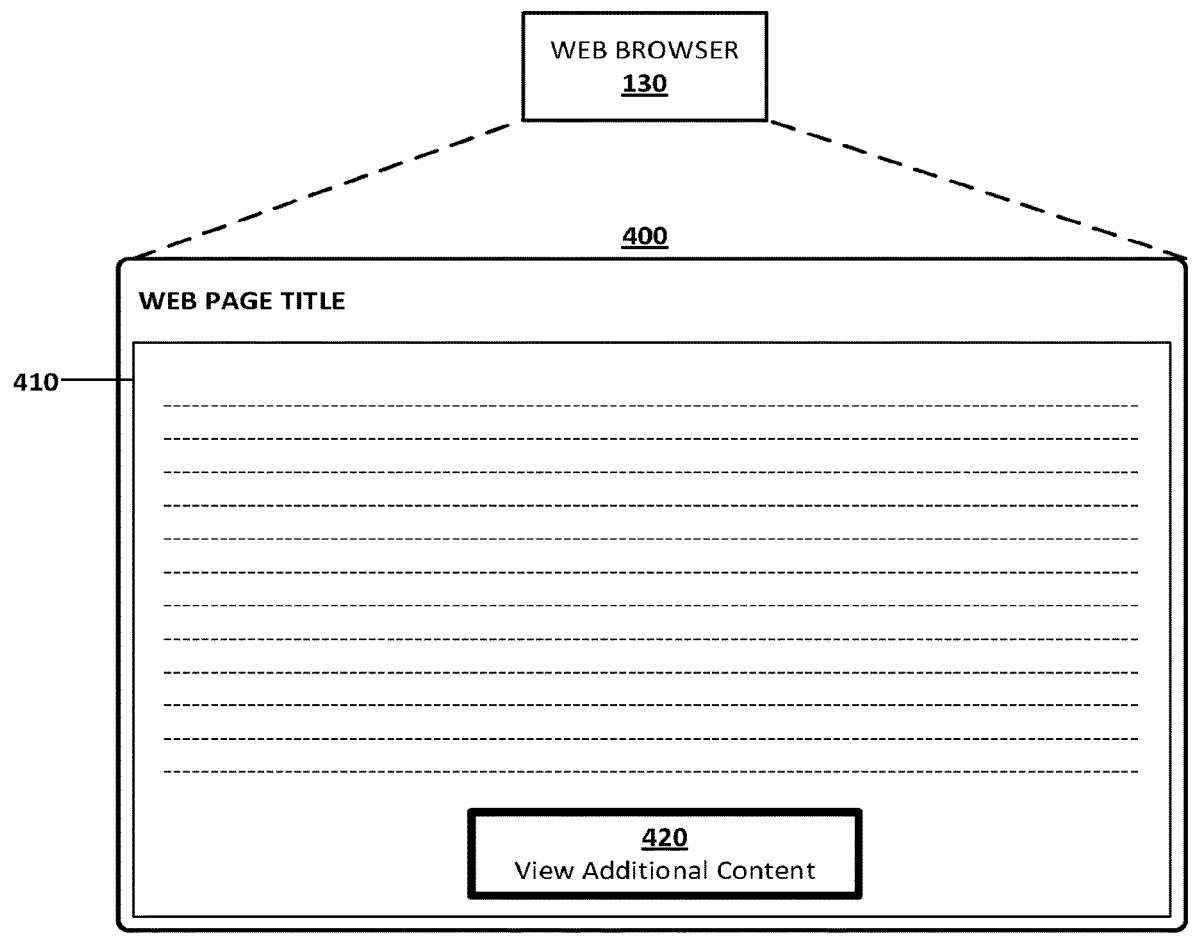
Figure 4C:
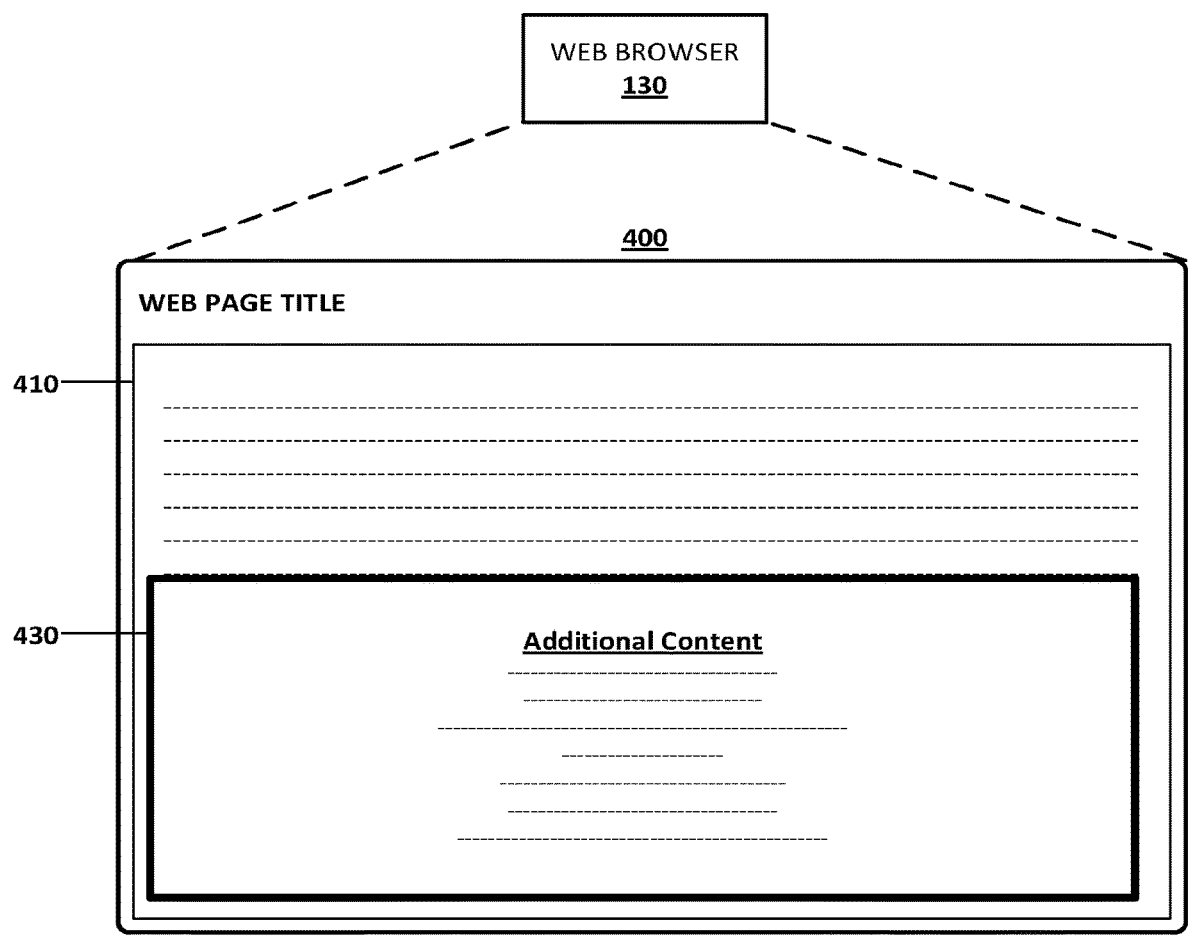

FIGS. 4A, 4B, and 4C depict an example of how additional content selected based on a predicted intent of the user may be displayed by the web browser 130-1, . . . , 130-*n* and/or the plug-in 140-1, . . . , 140-*n*. The scenario of FIGS. 4A, 4B, and 4C is for illustrative purposes only. In FIGS. 4A, 4B, and 4C, the web browser 130 displays a webpage 410 on a display 400. In response to an occurrence of one or more display conditions (e.g., a length of time, of the user visiting the webpage, exceeding a time threshold or a scroll percentage of the webpage exceeding a scroll threshold), the system may display a button 420, as shown in FIG. 4B. In response to receiving user interface input provided by a user who is visiting the webpage 410, that is determined to be a request for additional content (e.g., a selection of the button 420 shown in FIG. 4B), the system may display the additional content 430, as shown in FIG. 4C. Alternatively, in response to an occurrence of one or more display conditions (e.g., a length of time, of the user visiting the webpage, exceeding a time threshold or a scroll percentage of the webpage exceeding a scroll threshold), the system may display the additional content 430, as shown in FIG. 4C.

Figure 5:
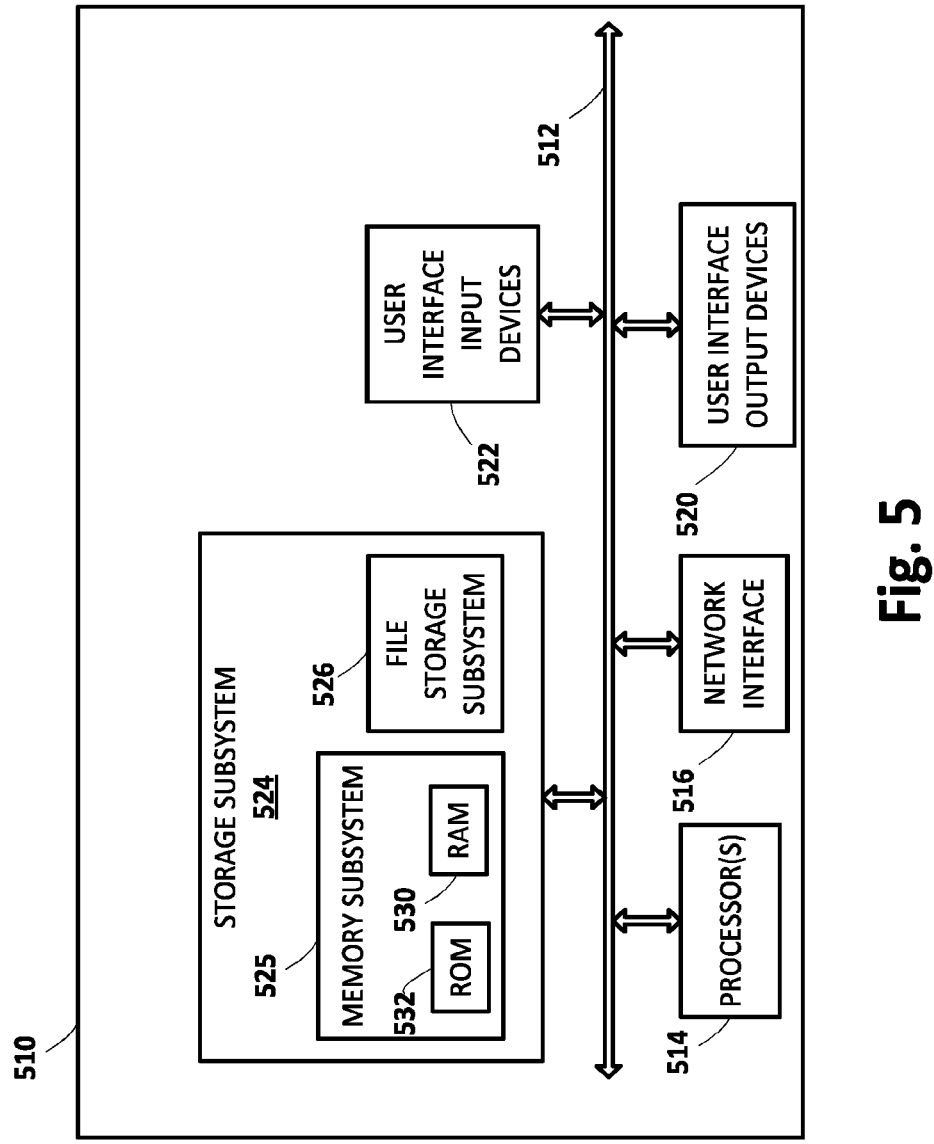
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 2 and 3, as well as to implement various components depicted in FIG. 1.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
receiving information identifying a webpage that a user is visiting and a navigational path of the user in navigating to the webpage;
determining a predicted intent of the user based on the information identifying the webpage that the user is visiting and the navigational path of the user in navigating to the webpage;
identifying at least one search query, wherein each search query of the at least one search query is identified based on a highest frequency with which the results returned by the search query are used to navigate to the webpage;
identifying at least one related question based on the at least one search query;
monitoring to determine an occurrence of one or more display conditions; and
responsive to determining the occurrence of one or more of the display conditions, displaying an overlay, on a portion of the webpage, that includes the at least one related question.

2. The method according to claim 1, wherein displaying the overlay comprises displaying each of the at least one related question as a selectable link.

3. The method according to claim 2, further comprising:
receiving user interface input comprising a selection of the selectable link associated with one of the at least one related question; and
displaying search results for the related question corresponding to the selection of the selectable link.

4. The method according to claim 1, wherein the at least one related question is further selected based on properties of the webpage, the properties of the webpage including a category of content included in the webpage or a function provided by the webpage.

5. The method according to claim 1, wherein the one or more display conditions include a length of time, of the user visiting the webpage, exceeding a time threshold.

6. The method according to claim 1, wherein the one or more display conditions include a scroll percentage of the webpage exceeding a scroll threshold.

7. The method according to claim 1, wherein a web browser plugin causes the overlay to be displayed on the portion of the webpage.

8. The method according to claim 1, wherein displaying the overlay comprises displaying a slide drawer that slides over the portion of the web page.

9. The method according to claim 1, wherein in displaying the overlay, the overlay is displayed over a lower portion of the web page.

10. A computer program product comprising one or more computer-readable storage media having program instructions collectively stored on the one or more computer-readable storage media, the program instructions executable to:
receive information identifying a webpage that a user is visiting and a navigational path of the user in navigating to the webpage;
determine a predicted intent of the user based on the information identifying the webpage that the user is visiting and the navigational path of the user in navigating to the webpage;
identify at least one search query, wherein each search query of the at least one search query is identified based on a highest frequency with which the results returned by the search query are used to navigate to the webpage;
identify at least one related question based on the at least one search query;
monitor to determine an occurrence of one or more display conditions; and
responsive to determining the occurrence of one or more of the display conditions, display an overlay, on a portion of the webpage, that includes the at least one related question.

11. The computer program product according to claim 10, wherein displaying the overlay comprises displaying each of the at least one related question as a selectable link.

12. The computer program product according to claim 11, the program instructions further being executable to:
receive user interface input comprising a selection of the selectable link associated with one of the at least one related question; and
display search results for the related question corresponding to the selection of the selectable link.

13. The computer program product according to claim 10, wherein the at least one related question is further selected based on properties of the webpage, the properties of the webpage including a category of content included in the webpage or a function provided by the webpage.

14. The computer program product according to claim 10, wherein the one or more display conditions include a length of time, of the user visiting the webpage, exceeding a time threshold.

15. The computer program product according to claim 10, wherein the one or more display conditions include a scroll percentage of the webpage exceeding a scroll threshold.

16. The computer program product according to claim 10, wherein a web browser plugin causes the overlay to be displayed on the portion of the webpage.

17. The computer program product according to claim 10, wherein displaying the overlay comprises displaying a slide drawer that slides over the portion of the web page.

18. The computer program product according to claim 10, wherein in displaying the overlay, the overlay is displayed over a lower portion of the web page.

19. A system comprising:
a processor, a computer-readable memory, one or more computer-readable storage media, and program instructions collectively stored on the one or more computer-readable storage media, the program instructions executable to:
receive information identifying a webpage that a user is visiting and a navigational path of the user in navigating to the webpage;
determine a predicted intent of the user based on the information identifying the webpage that the user is visiting and the navigational path of the user in navigating to the webpage;

identify at least one search query, wherein each search query of the at least one search query is identified based on a highest frequency with which the results returned by the search query are used to navigate to the webpage;

identify at least one related question based on the at least one search query;

monitor to determine an occurrence of one or more display conditions; and responsive to determining the occurrence of one or more of the display conditions, display an overlay, on a portion of the webpage, that includes the at least one related question.

20. The system according to claim 19, wherein displaying the overlay comprises displaying each of the at least one related question as a selectable link.

\* \* \* \* \*